W. WALKER & T. EASTON.
TILE TRAP.
APPLICATION FILED NOV. 2, 1915.
1,193,320.
Patented Aug. 1, 1916.
2 SHEETS—SHEET 1.
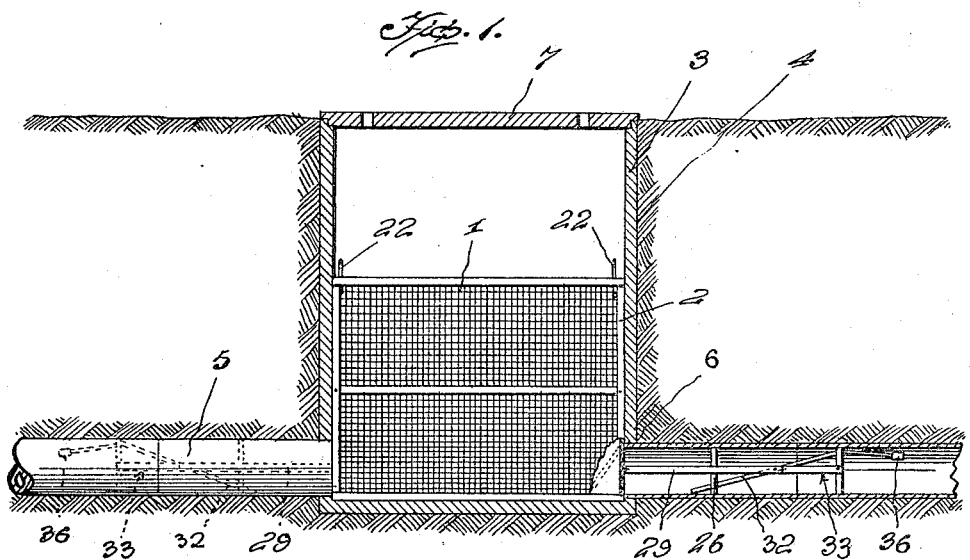
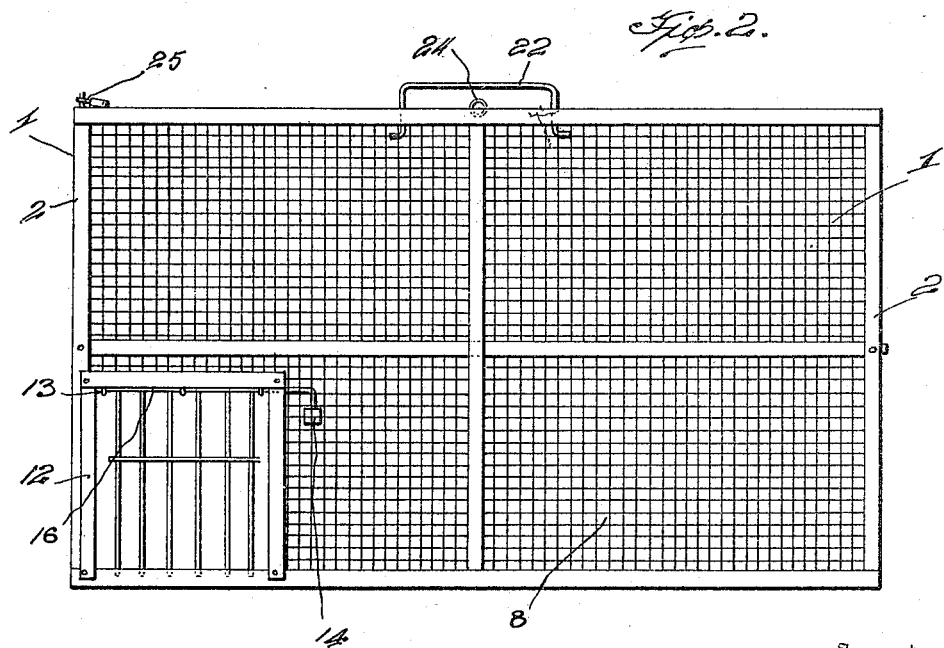

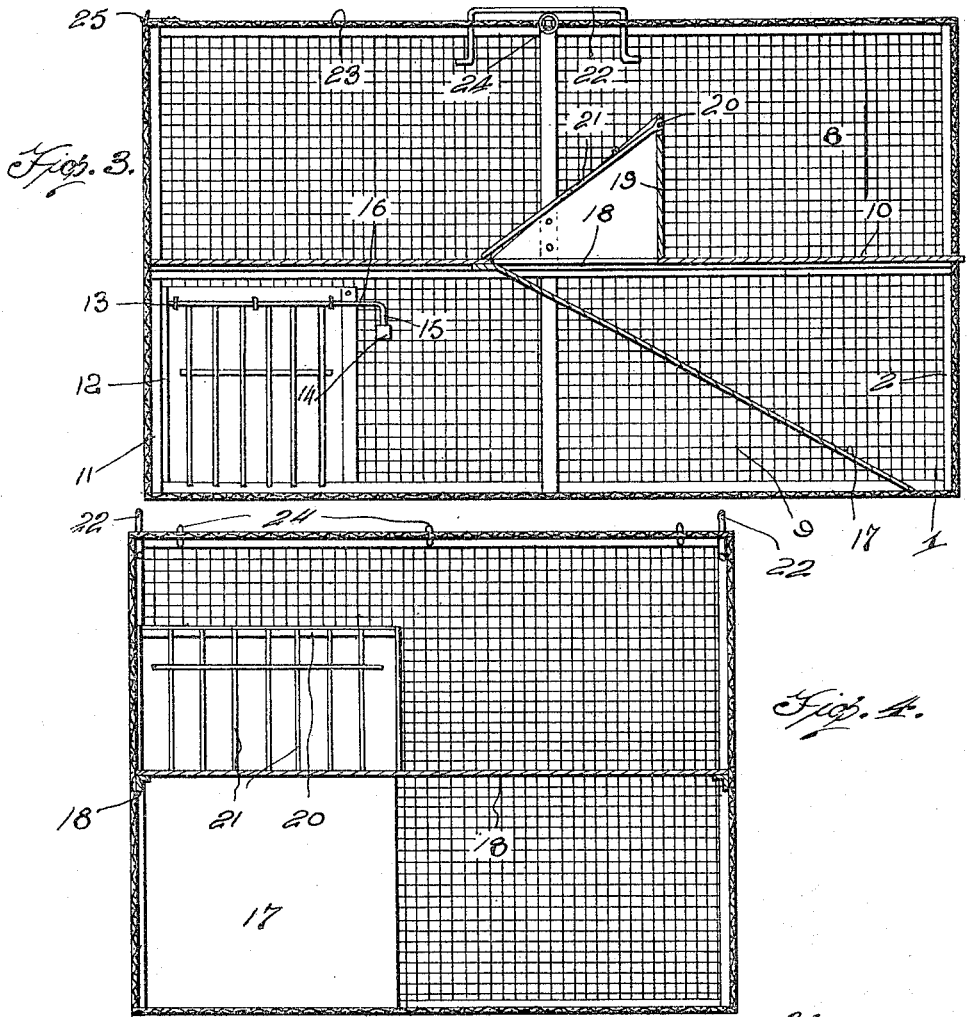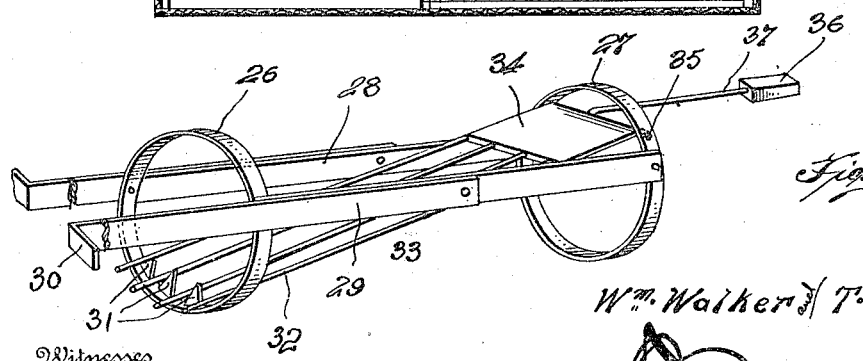

UNITED STATES PATENT OFFICE.

WILLIAM WALKER AND THOMAS EASTON, OF FAIRBURY, ILLINOIS.

TILE-TRAP.

1,193,320. Specification of Letters Patent. Patented Aug. 1, 1916.

Application filed November 2, 1915. Serial No. 59,271.

*To all whom it may concern:*

Be it known that we, WILLIAM WALKER and THOMAS EASTON, citizens of the United States, residing at Fairbury, in the county of Livingston and State of Illinois, have invented certain new and useful Improvements in Tile-Traps; and we do hereby declare the following to be a full, clear, and exact description of the invention, such as will enable others skilled in the art to which it appertains to make and use the same.

The invention relates to improvements in animal traps.

The object of the present invention is to improve the construction of animal traps and to provide a simple, practical, and comparatively inexpensive animal trap designed for use in tiles for trapping vermin and capable of being readily applied in position in a tile line and of effectively preventing such animals from passing through the same and of capturing those entering the trap from either side and of enabling the captured animals to be readily destroyed.

A further object of the invention is to provide a three part tile trap of this character comprising a pair of inlets and a receiving trap adapted to be readily removed either for destroying the captured animals or for use as a rat trap when the trapping season for field vermin is over.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawings Figure 1 is a vertical sectional view of the tile trap constructed in accordance with this invention and shown applied in position for use, Fig. 2 is a side elevation of the receiving trap, Fig. 3 is a longitudinal sectional view of the same, Fig. 4 is a transverse sectional view, Fig. 5 is a perspective view of one of the side inlet devices.

Like numerals of reference designate corresponding parts in the several figures of the drawings.

In the accompanying drawings in which is illustrated the preferred embodiment of the invention, 1 designates the body or casing of a receiving trap, said body or casing being constructed of heavy galvanized wire or other suitable material reinforced by metallic strips 2. The trap body or casing which may be constructed of any other suitable material is removably arranged within a concrete box 3 set in a hole or ditch 4 in the ground and intersecting a line of pipe or tiling 5. In placing the concrete box in position a hole is dug in the ground over the tiling or line of pipe and two of the tiles are taken out and the box is placed in position with the tiles in opposite sides of the same fitted in the side openings 6 or arranged contiguous to the same. The box 3 is provided with a removable cover 7 which is adapted to be taken off to afford access to the receiving trap.

The body or casing of the receiving trap is divided into upper and lower compartments 8 and 9 by a removable horizontal floor or partition 10 and it has side openings 11 located at the openings 6 in the side walls of the box 3. The receiving trap is equipped at the side openings 11 with automatically closable doors 12 hinged at the top at 13 and arranged to open inwardly and provided with weights 14 carried by arms 15 preferably formed by terminal portions of the pintle rod 16. The arms are arranged at right angles to the pintle rod 16 and extend downwardly therefrom when the side doors 12 are closed and are swung upwardly and inwardly when the doors are opened whereby the weights are adapted to close the doors automatically after an animal has entered the receiving trap.

The receiving trap is equipped with an inclined run-way 17 extending upwardly from one end of the receiving trap to an opening 18 in the floor or partition 10 for conducting the captured animals from the lower compartment to the upper compartment. The opening 18 is located at a point approximately midway between the ends of the receiving trap at one side thereof and a floor or partition is provided around the trap with a door casing 19 composed of approximately triangular sides and a rectangular rear wall at the upper edges of which at 20 is hinged an inclined trap door 21 which is normally supported in a closed position by the inclined side walls of the trap door casing 19.

The animals passing up the run-way will lift the trap door 19 and enter the upper compartment in which they are confined until they are destroyed. The receiving trap is provided with suitable handles 22 to enable it to be readily lifted out of the concrete box 3 and it is provided at the top with a door 23 hinged at 24 at the inner end and secured at the outer end to the body or casing of the receiving trap by a suitable catch 25.

Within the tile pipe at each side of the box 3 is arranged an inlet or inlet device comprising inner and outer bands or rings 26 and 27 connected by side bars 28 and equipped with anchoring arms or bars 29 extending inwardly and having outturned terminals 30 which are fitted within the box 3 between the same and the receiving trap. The anchoring arms are shown consisting of separate pieces secured at their inner terminals to the side bars 28 but they may be constructed in any other desired manner. The outer ring or band is provided at the bottom with teeth or tapered projections 31 between which are arranged wires or rods 32 of an inclined trap door 33 provided at the upper portion with a plate 34 of sheet metal or other suitable material and hinged by a transverse pintle 35 within the inner ring or band 26 at the upper portion thereof. The inclined door 33 is adapted to permit animals to pass under it and enter the receiving trap and it will prevent such animals after passing under it from leaving the tile without going into the said trap. The trap door or closure 33 is equipped with a weight 36 secured to the upper portion of the door by means of an arm 37 and adapted to partially counter-balance the door 33 to enable the same to be readily opened by a relatively small animal.

The inlet may be reversed and arranged in the outer portion of a tile pipe line to prevent the entrance of animals into the same and it will then permit any animal in the tile to readily pass out of the same.

By removing the cover the contents of the receiving trap may be readily observed and in case of a captured skunk, chloroform may be used before removing the trap from the box 3.

What is claimed is:—

1. A trap of the class described including a receiving trap provided at opposite sides with openings and designed to be arranged in a line of pipe in communication with the same and provided at the said openings with automatically closable trap doors, a horizontal partition or floor dividing the receiving trap into upper and lower compartments, an inclined run-way extending downwardly from an opening in the said floor or partition, a door casing surrounding the said opening and having inclined edges at opposite sides of the same and a trap door hinged to the door casing and normally supported in a closed position upon the said inclined edges.

2. A trap of the class described including a receiving trap having a side opening and designed to be arranged in communication with a line of pipe and an inlet located within the line of pipe and extending from the said side openings and having means for anchoring it thereat, said inlet being composed of spaced rings or bands, and an inclined trap door hinged within one of the rings or bands and supported by the other ring or band at the bottom thereof.

3. A trap of the class described including a receiving trap having a side opening and designed to be arranged in communication with a line of pipe and an inlet located within the line of pipe and extending from the said side openings and having means for anchoring it thereat, said inlet being composed of spaced bands, side bars connecting the bands and having anchoring arms extending to the said receiving trap and an inclined trap door hinged within one of the rings or bands at the upper portion thereof and supported within the other ring or band at the lower portion thereof.

4. A trap of the class described including an inlet device comprising spaced rings designed to be arranged within a pipe, means for connecting the rings, one of the rings being provided at the bottom with projections and an inclined trap door hinged within the upper portion of the other ring and having rods or members supported between the projections.

5. A trap of the class described including an inlet device comprising spaced rings designed to be arranged within a pipe, side bars connecting the same and provided with anchoring arms having terminal engaging portions and an inclined trap door hinged within one of the rings at the upper portion thereof and supported within the other ring or band at the lower portion thereof.

6. The combination with a line of pipe of a box intersecting and having side openings communicating with the line of pipe, a removable trap arranged within the box and having side doors located at the said side openings of the box, and inlet devices located within the pipe and provided with arms having terminal engaging portions extending into the opening of the box and engaging the latter for retaining the said inlet devices at the side doors, said inlet devices being provided with inclined trap doors.

In testimony whereof we affix our signatures in presence of two witnesses.

WILLIAM WALKER.
THOMAS EASTON.

Witnesses:
HENRY WEBER,
J. R. LINDELOF.

Copies of this patent may be obtained for five cents each, by addressing the "Commissioner of Patents, Washington, D. C."